United States Patent [19]

von der Crone et al.

[11] 4,052,410
[45] Oct. 4, 1977

[54] IMINOISOINDOLINE PIGMENTS

[75] Inventors: Jost von der Crone; Andre Pugin, both of Riehen; Rudolf Mory, Dornach, all of Switzerland

[73] Assignee: CIBA-GEIGY Corporation, Ardsley, N.Y.

[21] Appl. No.: 704,276

[22] Filed: July 12, 1976

Related U.S. Application Data

[62] Division of Ser. No. 472,401, May 22, 1974, Pat. No. 3,979,386.

[30] Foreign Application Priority Data

May 29, 1973 Switzerland .................. 7718/73
May 29, 1973 Switzerland .................. 7719/73

[51] Int. Cl.² .................. C07D 403/12; C07D 401/12
[52] U.S. Cl. .................. 548/305; 8/4; 8/6.5
[58] Field of Search .................. 260/309.2

[56] References Cited

U.S. PATENT DOCUMENTS 3,646,033  2/1972  Leister et al. .................. 260/309.2
3,767,643  10/1973 Kunstmann et al. .............. 260/309.2

*Primary Examiner*—Henry R. Jiles
*Assistant Examiner*—Robert T. Bond
*Attorney, Agent, or Firm*—Vincent J. Cavalieri

[57] ABSTRACT

Iminoisoindolinone pigments of the formula

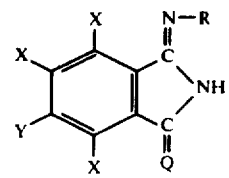

wherein
X represents halogen atoms,
Y represents a halogen atom, an alkoxy, cycloalkoxy, aralkoxy, aryloxy, alkylthio or arylthio group,
R represents an aromatic radical containing a cyclic bound -CONH group, and
Q represents an O-atom or the group =N-R are useful for coloring plastics and lacquers in yellow shades having excellent fastness properties.

3 Claims, No Drawings

IMINOISOINDOLINE PIGMENTS

This is a divisional of application Ser. No. 472,401 filed on May 22, 1974 now U.S. Pat. No. 3,979,386, which issued on Sept. 7, 1976.

It has been found that new valuable iminoisoindoline pigments of the formula

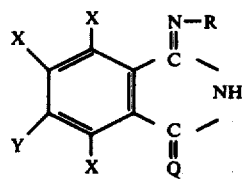
(I)

wherein
X represents halogen atoms,
Y represents a halogen atom, an alkoxy, cycloalkoxy, aralkoxy, aryloxy, alkylthio or arylthio group,
R represents an aromatic radical containing a cyclic bound —CONH group, and
Q represents an O-atom or a group of the formula R-N=, are obtained by condensation of a tri- or tetrahalo-isoindolinone-1 of the formula

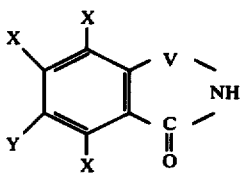
(II), or of a tri- or tetrahalo-isoindolinone of the formula

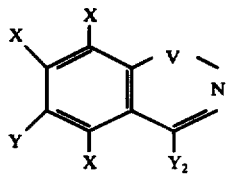
(III), whereby, in the given formulae,
V represents a group of the formula

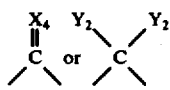

wherein
$X_4$ represents an imino or thio group, and the
$Y_2$'s represent halogen atoms, alkoxy groups or secondary amino groups,
with an amine of the formula R-NH$_2$ wherein
R represents an aromatic radical containing a cyclic bound carboxylic acid amide group.

Since the dyestuffs according to the invention are pigments, acid water-solubilising groups, particularly sulphonic acid groups or carboxylic acid groups, are excluded.

Of special interest are pigments of the formula

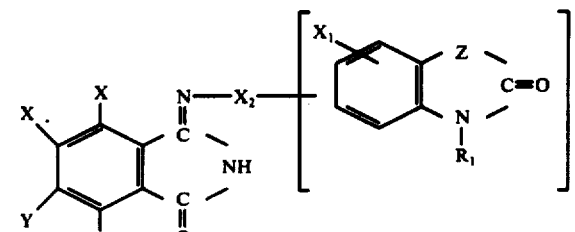
(I)

wherein
$R_1$ represents an H-atom, an alkyl group containing 1–4 carbon atoms, or a phenyl radical optionally substituted by halogen atoms, alkyl, alkoxy or alkanoylamino groups containing 1–4 carbon atoms,
X and Y have the defined meanings,
$X_1$ represents a hydrogen or halogen atom, and alkyl or alkoxy group containing 1–4 carbon atoms, or a phenoxy group,
$X_2$ represents a direct bond, a phenyl, phenylazo, phenylazophenylene or benzoylamino group optionally substituted, for example, by halogen atoms, alkyl or alkoxy groups containing 1–4 carbon atoms, and
Z represents a one- or two-membered bridge, especially an O- or S-atom or a group of the formula

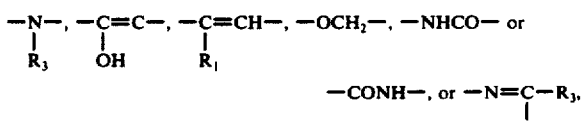

$R_3$ represents an H-atom, an alkyl group containing 1–4 carbon atoms, or a phenyl radical optionally substituted by halogen atoms, alkyl, alkoxy or alkanoylamino groups containing b 1–4 carbon atoms, which phenyl radical can be bound by a direct bond to the imino group of the isoindoline radical, whereby
Z must represent a —NH-group if
$R_1$ is not an H-atom; as well as pigments of the formula

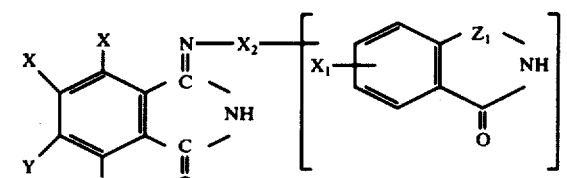

wherein X, $X_1$, $X_2$ and Y have the given meanings and $Z_1$ represents a group of the formula

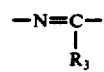

or —CONH—.

Particularly preferred pigments are those of the formula

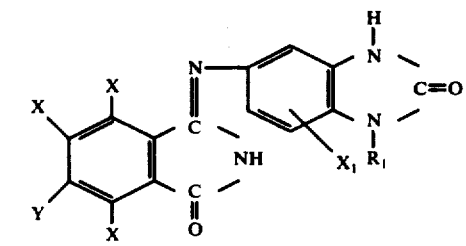

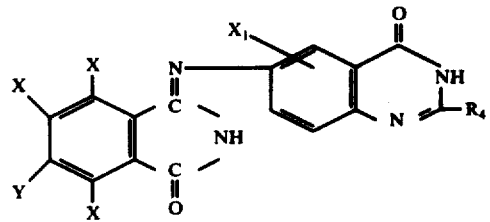

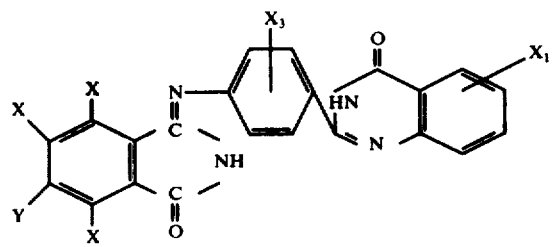

wherein
R₁, X, X₁ and Y have the given meanings,
R₄ represents an H-atom, a hydroxyl group, an alkyl group containing 1–4 carbon atoms or a phenyl group, and
X₃ represents an H-atom or halogen atom, an alkyl or alkoxy group containing 1–4 C-atoms or a phenoxy group.

Also of particular interest are pigments of the formula

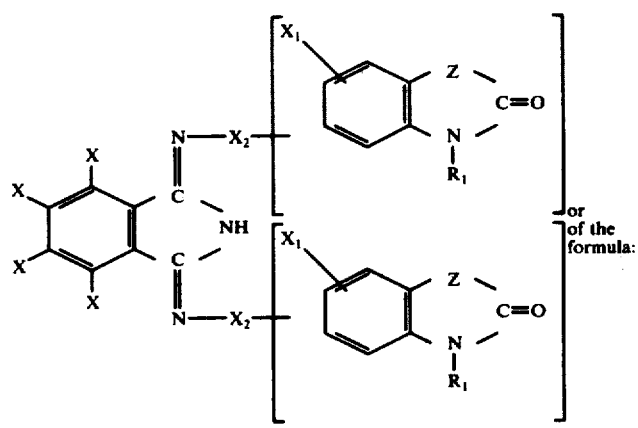

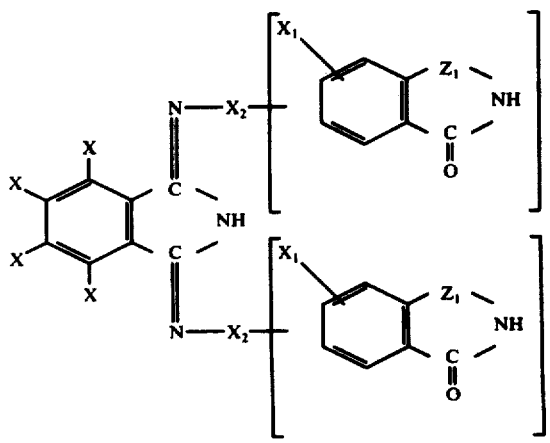

wherein R₁, X, X₁, X₂, and Z and Z₁ have the defined meanings. Pigments likewise preferred are those of the formulae

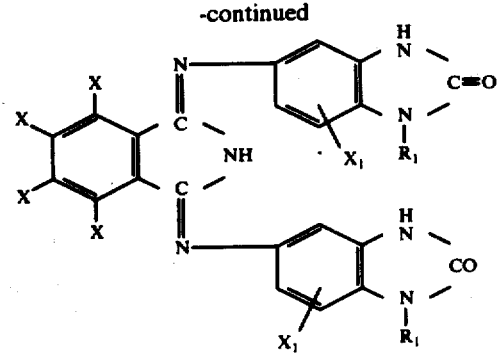

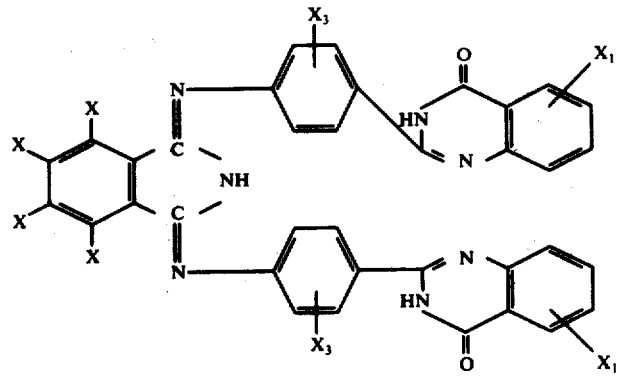

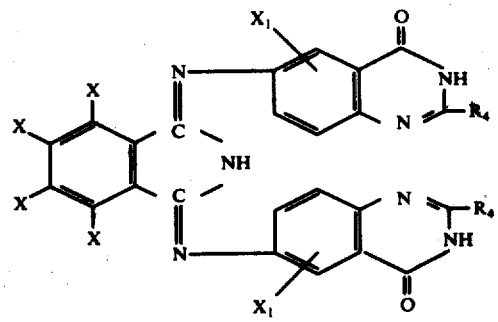

wherein $R_1$, $R_4$, X, $X_1$ and $X_3$ have the given meanings.

The starting materials used for those pigments of formula I wherein Q represents an O-atom are preferably iminoisoindolinones of the formula

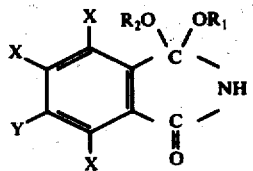

wherein
X and Y have the defined meanings and
$R_2$ represents an alkyl group containing 1-4 carbon atoms; and especially iminoisoindolinones wherein X and Y represents chlorine atoms.

The starting materials wherein
Y represents a chlorine atom are known, and those wherein
Y represents an alkoxy, cycloalkoxy, aralkoxy, aryloxy, alkylthio or arylthio group are obtained by reaction of an ammonium salt or an ester of tetrachloro-o-cyanobenzoic acid, in a hydrophilic organic solvent, with a compound of the formula YMe wherein
Y has the above defined meaning and
Me represents an akali metal atom, and, if required, esterification of the product obtained.

Mentioned as examples of iminoisoindolinones are:
3,3-dimethoxy-4,5,6,7-tetrachloro-isoindolinone,
3,3-dimethoxy-4,5,6,7-tetrabromo-isoindolinone,
3,3-dimethoxy-4,5,7-trichloro-6-butoxy-isoindolinone,
3,3-dimethoxy-4,5,7-trichloro-6-phenoxy-isoindolinone,
3,3-dimethoxy-4,5,7-trichloro-6-(p-chlorophenoxy)-isoindolinone,
3,3-dimethoxy-4,5,7-trichloro-6-(o-methylphenoxy)-isoindolinone,
3,3-dimethoxy-4,5,7-trichloro-6-methylmercapto-isoindolinone,
3,3-dimethoxy-4,5,7-trichloro-6-ethylmercapto-isoindolinone.

For those pigments of formula I wherein Q stands for a radical of the formula R-N=, the starting materials employed are preferably such compounds of formula III wherein the X's represent chlorine atoms, and the $Y_2$'s chlorine atoms, ether groups, for example, alkoxy groups containing 1-4 carbon atoms or phenoxy groups or tert. amino groups, for example, morpholino groups; or wherein $X_4$ represents an imino group of the formula =N-R', and $Y_2$ represents in this case preferably an amino group of the formula —NH-R'. In these formulae, R' represents hydrogen or an optionally nonionic substituted alkyl group such as the methyl, ethyl or butyl group, the γ-methoxypropyl group or the β-hydroxyethyl group; R' preferably denotes hydrogen. Isoindolines of this type can occur in tautomeric forms; where a structural formula is given, this is also to include the tautomeric structures.

Starting materials of the formula III wherein $Y_2$ represents chlorine are obtained according to the process described in 'Zeitschrift fur Angewandte Chemi' (Journal for Applied Chemistry) 68, 133–68 (1965) by reaction of tetrachloro- or tetrabromophthalic acid anhydride with phosphorus pentachloride; with use of tetrabromophthalic acid anhydride, some bromine atoms can be exchanged for chlorine. By reaction of this 1,3,3-trichloro-isoindoline compound with a metal alcoholate or metal phenolate or with a secondary amine, starting materials of formula III wherein the $Y_2$'s represent ether groups or tertiary amino groups are obtained. If a 1,3,3-trichloroisoindoline compound is reacted with an amine of the formula R'-NH$_2$, then starting materials of formula III wherein $X_4$ represents an imino group of the formula =N-R' and Y an amino group of the formula -NH-R' are obtained.

The following isoindolenines are given as examples:
1,3,3-trimethoxy-4,5,6,7-tetrachloro-isoindolenine,
1,3,3-trimethoxy-4,5,6,7-tetrabromo-isoindolenine,
1,3,3-triethoxy-4,5,6,7-tetrachloro-isoindolenine,
1,3,3,4,5,6,7-heptachloro-isoindolenine,
1,3,3-trimorpholino-4,5,6,7-tetrachloro-isoindolenine,
1-amino-3-imino-4,5,6,7-tetrachloro-isoindolenine,
1-methylamino-3-methylimino-4,5,6,7-tetrachloro-isoindolenine.

The isoindolenines mentioned are known compounds.

The isoindolinones and isoindolenines mentioned are to be condensed with the amines of the formula H$_2$N-R.

Of particular interest are amines of the formula

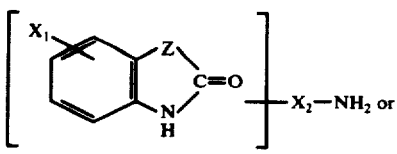

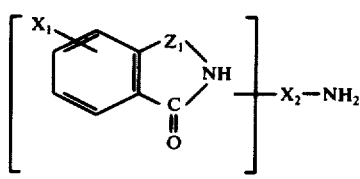

wherein $X_1$, $X_2$, Z and $Z_1$ have the defined meanings, and especially amines of the formula

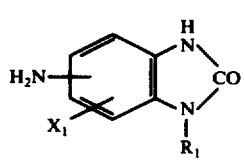

wherein $R_1$ and $X_1$ have the given meanings.

Also of interest are quinazolones of the formula

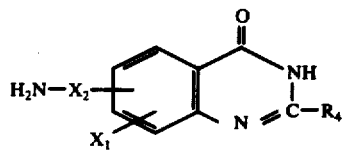

wherein $X_1$ and $X_2$ have the given meanings, and $R_4$ represents an H-atom, a hydroxy group, an alkyl group containing 1–4 carbon atoms or a phenyl group; or quinazolones of the formula

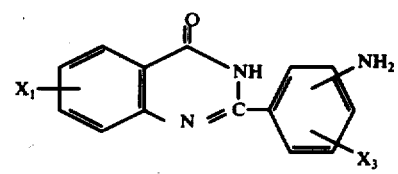

wherein $X_1$ and $X_3$ represent hydrogen or halogen atoms, alkyl or alkoxy groups containing 1–4 carbon atoms or a phenoxy group; or di- or triazines of the formula

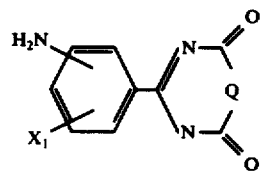

wherein $X_1$ has the given meaning, and Q represents a group of the formula —NH— or —CH—R$_1$, as well as phenmorpholones of the formula

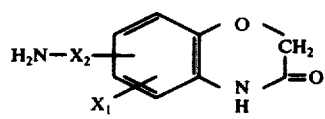

wherein $Z_1$ and $X_2$ have the given meanings; also aminoquinolones of the formula

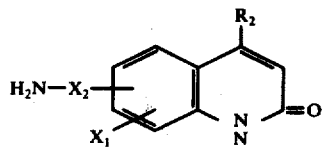

wherein $R_2$, $X_1$ and $X_2$ have the given meanings; or aminoisoquinolones of the formula

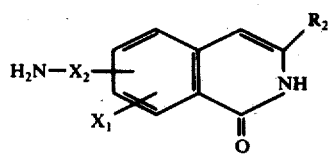

wherein $R_2$, $X_1$ and $X_2$ have the given meanings.
The following are listed as examples:
5-amino-benzimidazolone,
5-amino-1-methyl-benzimidazolone, 5-amino-1-n-butyl-benzimidazolone,
5-amino-1-phenyl-benzimidazolone,
5-amino-1-p-chlorophenyl-benzimidazolone,
5-amino-1-p-methylphenyl-benzimidazolone,
5-amino-1-p-methoxyphenyl-benzimidazolone,
5-amino-1-p-acetylaminophenyl-benzimidazolone,
5-amino-6-chloro-benzimidazolone,
3-amino-6-bromo-benzimidazolone,
5-amino-6-methyl-benzimidazolone,
5-amino-6-methoxy-benzimidazolone,
6-amino-benzoxazolone,
6-amino-5-chloro-benzoxazolone,
6-amino-5-methyl-benzoxazolone,
6-amino-5-chloro-benzthiazolone,
6-amino-5-methyl-benzthiazolone,
6-amino-quinazolone-4,
6-amino-2-methyl-quinazolone-4,
6-amino-2-methoxy-quinazolone-4,
6-amino-7-methyl-quinazolone-4,
6-amino-2-phenyl-quinazolone-4,
6-amino-2(4'-methoxyphenyl)-quinazolone-4,
6-amino-2(4'-methylphenyl)-quinazolone-4,
7-amino-quinazolone-4,
2-(4'-aminophenyl)-quinazolone-4,
2-(3'-aminophenyl)-quinazolone-4,
2-(4'-amino-3'-methoxyphenyl)-quinazolone-4,
2-(4'amino-3'-chlorophenyl)-quinazolone-4,
2-(3'-amino-4'-methylphenyl)-quinazolone-4,
6-amino-2,4-dihydroxyquinazoline,
2-(4'-aminophenyl)-4,6-dihydroxy-1,3-diazine,
4-(4'-aminophenyl)-2,6-dihydroxy-1,3,5-triazine,
7-amino-phenmorpholone-3,
6-amino-phenmorpholone-3,
7-amino-6-chloro-phenmorpholone-3,
7-amino-6-methyl-phenmorpholone-3,
7-amino-6-methoxy-phenmorpholene- 3,
6-amino-quinolone-2,
6-amino-4-methyl-quinolone-2,
7-amino-4,6-dimethyl-quinolone-2,
6-amino-7-chloro-4-methyl-quinolone-2,
7-amino-4-methyl-6-methoxy-quinolone-2,
6-amino-1,3-dihydroxy-isoquinoline,
6-amino-2,4-dihydroxy-quinoline,
6-amino-2,3-dihydroxyquinoxaline, as well as
5-(4'-amino-2'-methyl-phenylazo)-benzimidazolone,
5-(4'-amino-2'-methyl-5'-methoxy-phenylazo)-benzimidazolone,
5-(4'-amino-2,5'-dimethoxy-phenylazo)-benzimidazolone,
5-(4'-amino-benzoylamino)-benzimidazolone,
5-(3'-amino-benzoylamino)-benzimidazolone,
5-(3'-amino-4'chloro-benzoylamino)-benzimidazolone,
5-(3'-amino-4'-methyl-benzoylamino)-benzimidazolone,
7-(4'-amino-2'-methyl-5'-methoxy-phenylazo)-4-methylquinoline-2,
6-(4'-amino-2'-methyl-phenylazo)-quinazolone-4,
2-[(4"amino-2"-methyl-5"-methoxyphenyl)-4'-azophenylene]-quinazolone, as well as
7-(4'-amino-2'-methyl-phenylazo)-phenmorpholone-3.

Condensation of haloisoindolinone with the amine is performed in some cases in the cold state; if necessary, however, with heating of the intimately mixed components; and particularly advantageously in the presence of inert organic solvents, i.e. those not participating in the reaction.

If the starting materials are 3-imino-, 3-thio- or 3,3-bis-sec. amino-4,5,6,7-tetrachloroisoindolin-1-ones or alkali salts of 3,3-dialkoxy-4,5,6,7-tetrachloroisoindolin-1-ones, then it is advantageous to use water-miscible organic solvents, e.g. lower aliphatic alcohols, such as lower alkanols, for example, methanol, isopropanol or butanol, lower cyclic ethers such as dioxane, ethylene glycol monomethyl ether, or lower aliphatic ketones such as acetone. Condensation is effected in this case already at comparatively low temperatures. The process of performed advantageously in the presence of base-binding agents; to be mentioned as such are, for example, lower fatty acids, which then simultaneously serve as solvents, particularly acetic acid.

With the use of 3,3-dihalo-4,5,6,7-tetrachloroisoindolin-1-ones, organic solvents free from hydroxyl groups are preferred, such as hydrocarbons, e.g. aromtaic hydrocarbons, such as benzene, toluene, xylene, tetrahydronaphthalene or diphenyl, or cycloaliphatic hydrocarbons, e.g. cyclohexane, also halogenated hydrocarbons such as aliphatic halogenated hydrocarbons, e.g. carbon tetrachloride or tetrachloroethylene, or aromatic halogenated hydrocarbons such as chlorobenzene or di- and trichlorobenzenes, also aromatic nitrohydrocarbons, such as nitrobenzenes, ethers, that is, aliphatic ethers such as dibutyl ether, aromatic ethers such as diphenyl ether, or cyclic ethers such as dioxane, also ketones such as acetone, or esters, especially esters of lower fatty acids, with lower alkanols such as acetic acid ethyl ester, in the presence of acid-binding agents.

The reaction of the amine of the formula $R-NH_2$ with the isoindolenines of formula III wherein $Y_2$ represents chlorine is performed by heating of the two starting materials in the absence of compounds containing hydroxyl groups, advantageously at a temperature of between 50° and 250° C, whereby, as a rule, the split-off hydrogen chloride escapes from the reaction mixture. Advantageously, the reactant is reacted in an inert solvent, for example, in an optionally halogenated or nitrated hydrocarbon. Instead of allowing the hydrogen chloride to escape, it can also be bound with suitable acid-binding agents, e.g. by means of an excess of phenylamine that is to be used or of a tertiary amine, such as treithylamine, N,N-diethylaniline or pyridine; the reaction in this case can be performed already at room temperature.

The reaction of the amine of the formula $R-NH_2$ with the isoindolenine of formula III wherein $X_2$ represents $=N-R'$, particularly $=NH$, and $Y_2$ represents $-NH-R'$, especially $-NH_2$, is advantageously performed by heating of the reactant in an organic solvent. The employed organic solvents can optionally be halogenated or nitrated aromatic hydrocarbons, also higher-boiling alcohols, e.g. benzyl alcohol or ethylene glycol and mono-ethers thereof; particularly suitable solvents are lower fatty acids, such as glacial acetic acid.

Isoindolenines of formula III wherein the $Y_2$'s represent ether groups or tertiary amino groups are reacted with the amine of the formula $R-NH_2$ preferably in the presence of an organic acid, especially acetic acid. This reaction may be effected even in the presence of water.

In all these modifications of the process, the crude pigments mostly precipitate in the hot state, and can be isolated, in the analytically pure form, by filtration and, optionally, by washing with organic solvents.

The resulting pigments in general possess a good texture, and in most cases can be used as crude products. If necessary or desired, the crude products can be converted by grinding or kneading into a finely dispersed form. It is advantageous for this purpose to use grinding auxiliaries, such as inorganic and/or organic salts, in the presence or absence of organic solvents. An improvement of properties can frequently also be obtained by heating of the crude pigments in hot organic solvents. After grinding, auxiliaries are removed in the usual manner: soluble inorganic salts, e.g. with water, and water-insoluble organic auxiliaries, e.g. by steam distillation.

The pigments obtained according to the invention are suitable for dyeing high-molecular organic materials of natural or synthetic origin. These materials can be, e.g. natural resins, drying oils or rubber. Or they can be modified natural substances, for example, chlorinated rubber, oil-modified alkyd resins, or cellulose derivatives such as viscose, acetyl cellulose and nitrocellulose, and particularly fully synthetic organic polyplasts, i.e. plastics produced by polymerisation, polycondensation and polyaddition. The following in particular may be mentioned from this class of plastics: polyethylene, polypropylene, polyisobutylene, polystyrene, polyvinyl chloride, polyvinyl acetate, polyacrylonitrile, polyacrylic acid ester and polymethacrylic acid ester; polyesters, especially high-molecular esters of aromatic polycarboxylic acids with polyfunctional alcohols; polyamides; the condensation products of fomaldehyde with phenols, the so-called phenoplasts, and the condensation products of formaldehyde with urea, thiourea and melamine, or the so-called aminoplasts; the polyesters used as resins for lacquers and varnishes, both saturated polyesters, such as, e.g. alkyd reins, and unsaturated polyesters, such as, e.g. maleic resins, and also the polyaddition or polycondensation products of epichlorohydrin with diols or polyphenols, known under the name of "epoxide resins"; also the so-called thermoplasts, i.e. the non-curable polyplasts. It is to be emphasised that not only the homogeneous compounds can be pigmented according to the invention but also mixtures of polyplasts, as well as mixed condensation products and copolymers, such as, e.g. those based on butadiene.

The pigments according to the invention are especially suitable for the dyeing of vinyl, polyolefin and stryrene polymers, such as polyplasts, such as so-called film-forming agents or binders, known as raw materials for lacquers and varnishes, particularly linseed oil varnish, nitrocellulose, alkyd resins, melamine resins and urea-formaldehyde resins. The pigmenting of the high-molecular organic substances with the pigments of formula I is effected, for example, by the mixing of such a pigment, optionally in the form of master batches, into these substrates by the use of mixing rolls or mixing or grinding apparatus. The pigmented material is thereupon processed, by methods known per se such as calendering, moulding, extruding, coating or casting or by injection moulding, into the desired ultimate form. It is often desirable, for the preparation of non-rigid formed components, or to reduce brittleness thereof, to incorporate so-called plasticisers into the high-molecular compounds before forming. Those that can be used are, for example, esters of phosphoric acid, phthalic acid or sebacic acid. In the process according to the invention, the plasticisers can be introduced before or after incorporation of the pigment dyestuff into the polyplasts. It is also possible, or the purpose of obtaining various shades of colour, to add in any desired amounts to the high-molecular organic substances, in addition to compounds of formula I, also fillers or other colouring constituents, such as white, coloured or black pigments.

For the pigmenting of lacquers and printing inks, the high-molecular organic materials and the compounds of formula I, optionally together with additives such as fillers, other pigments, siccatives or plasticisers, are finely dispersed or dissolved in a common organic solvent or solvent mixture. The procedure may be such that the individual components are dispersed or dissolved separately or together with others, with all the components thereafter being combined.

The pigmented high-molecular organic materials generally contain amounts of 0.001 to 30 percent by weight of a compound of formula I, relative to the high-molecular organic substance to be pigmented; polyplasts and lacquers preferably contain 0.1 to 5% and printing inks preferably 10 to 30%. The amount of pigment used is governed in the first place by the tinctorial strength desired; also by the layer thickness of the formed components; and, finally, optionally also by the content of white pigment in the polyplast.

The pigmented high-molecular organic substances display very fast greenish-yellow, yellow, orange, red, claret-red or brown shades; the fastness properties in service are in general very good.

The following examples illustrate the invention. Temperature values in the examples are expressed in degrees Centigrade.

EXAMPLE 1

14.2 g of 3-imino-4,5,6,7-tetrachloroisoindolin-1-one and 7.8 g of 5-aminobenzimidazolone are heated in 150 ml of glacial acetic acid for one-half hour at reflux temperature. The pigment formed is filtered off hot and washed with methanol and water. After drying, there is obtained 18.0 g of a reddish yellow pigment of the formula

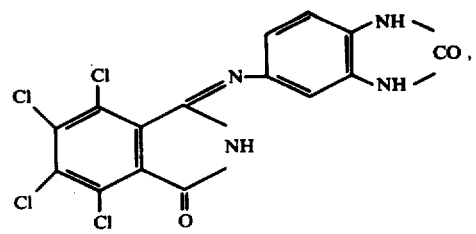

which in this form can be used directly for the dyeing of lacquers. The dyeings produced therewith are characterised by good fastness properties.

EXAMPLE 2

17.0 g of 3,3,4,5,6,7-hexachloroisoindolin-1-one and 8.6 g of 5-amino-1-methyl-benzimidazolone are heated in 200 ml of o-dichlorobenzene with stirring to 150°. There is immediately formed a reddish yellow precipitate, which is filtered off after 2 hours. After being washed with methanol and water, the dyestuff is dried. The yield is 19 g of a yellow pigment of the formula

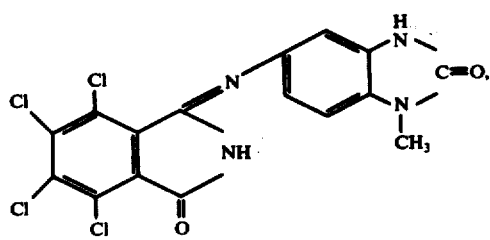

which can be used directly for dyeing plastics and lacquers. The yellow dyeings obtained therewith have an excellent fastness to migration and to light.

EXAMPLE 3

15.75 g of 3,4,5,6-tetrachloro-o-cyanobenzoic acid methyl ester is introduced into a solution of 100 ml of methanol and 2.7 g of sodium methylate, and stirred for ½ hour, with 3,3-dimethoxy-4,5,6,7-tetrachloroisoindolinone thus being formed. An addition is now made of 7.8 g of 5-aminobenzimidazolone and the whole is stirred for 15 hours at room temperature. The formed sodium salt of the pigment separates out as a green-yellow precipitate. Dilution is performed with 200 ml of o-dichlorobenzene and subsequently acidification with 10 ml of glacial acetic acid. With good stirring, the temperature is then raised, while methanol distills off, to 150°. After 2 hours, the temperature is allowed to drop to 100°; the insoluble pigment is filtered off and washed with methanol and water. After drying, there is obtained 20.7 g of a deeply coloured yellow pigment, which can be incorporated in this form directly into plastics, lacquers or varnishes and printing pastes. The dyeings produced therewith are characterised by excellent fastness properties.

EXAMPLES 4-20

The following table contains details of pigments that are obtained by condensing, according to the data given in the previous example, 3,4,5,6-tetrachloro-o-cyanobenzoic acid methyl ester with the amines listed in column II. The shades of the resulting pigments are shown in column III.

| No. | II Amines | III Shade |
|---|---|---|
| 4 | 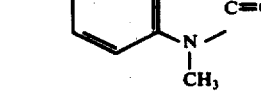 | yellow |
| 5 |  | yellow |
| 6 |  | orange |
| 7 |  | orange |
| 8 | 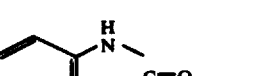 | yellow |
| 9 |  | greenish yellow |

| No. | II Amines | III Shade |
|---|---|---|
| 10 | (structure: 4-aminophenyl-NH-C(=O)-... =N-phenyl) | yellow |
| 11 | (structure: diaminobenzene with methoxy, fused cyclic urea NH-C(=O)-NH) | red |
| 12 | (structure: aminobenzene with OCH$_3$, CH$_3$, NH-C(=O)-) | yellow |
| 13 | (structure: aminobenzene with OCH$_3$, NH-C(=O)-) | yellow |
| 14 | (structure: aminobenzene with S-CH$_3$, NH-C(=O)-) | yellow |
| 15 | (6-amino-7-chloro-4-methyl-quinolin-2(1H)-one) | yellow |
| 16 | (5-aminoquinazoline-2,4(1H,3H)-dione) | yellow |
| 17 | (6-amino-2,3-dihydroxyquinoxaline) | yellow |
| 18 | (structure: acetamido, chloro-phenyl, N-(4-aminophenyl)) | yellow |
| 19 | (2-(4'-amino-biphenyl-4-yl)-quinazolin-4(3H)-one) | yellow |

-continued

| No. | II Amines | III Shade |
|---|---|---|
| 20 | (structure: benzamide with NH linked to imine to 3-methyl-4-aminophenyl, and N attached ortho to carbonyl forming ring) | yellow |

EXAMPLE 21

8.0 g of 3,4,6-trichloro-5-methoxy-2-cyanobenzoic acid methyl ester are stirred with 100 ml of methanol and 1.35 g of sodium methylate until a clear solution is obtained. An addition is then made of 4.3 g of 5-amino-1-methylbenzimidazolone and the whole is stirred for 15 hours at room temperature. The reaction mixture, from which the salt of the formed pigment precipitates, is diluted with 100 ml of o-dichlorobenzene and afterwards acidified with 5 ml of glacial acetic acid. The temperature is now raised, while methanol and glacial acetic acid distill off, to 150° C. After 2 hours, the insoluble dyestuff is filtered off at 100° and subsequently washed with methanol and water. The yield after drying is 10.8 g of a reddish yellow pigment.

In order to obtain a finely dispersed form of the pigment, the crude product is introduced into a solution of 100 ml of dimethylformamide, 2.7 g of sodium methylate and 20 ml of methanol, while thorough stirring is maintained. The solution is poured into 500 ml of water and the whole is acidified with 10 ml of acetic acid. The precipitated pigment is filtered off, washed with water and dried at 60°. The powder thus obtained is suitable for the colouring of lacquers or varnishes. The reddish yellow dyeings resulting therefrom are characterised by their excellent fastness to over-varnishing and to light.

Preparation of 3,4,6-trichloro-5-methoxy-2-cyanobenzoic acid methyl ester 30.2 g of 3,4,5,6-tetrachloro-2-cyanobenzoic acid ammonium salt is introduced, with stirring, into a solution of 10.8 g of sodium methylate in 32 ml of methanol and 100 ml of dimethylformamide. After the slightly exothermic reaction has subsided, stirring is continued for 15 hours at room temperature.

Esterification:

The reaction mixture is diluted with 80 ml of water, and the pH-value is adjusted to 8-9 by the addition of sulphuric acid. An addition is then made of 42 g of sodium bicarbonate, and 63 g of dimethyl sulphate is subsequently added dropwise. After completion of the dropwise addition, stirring is maintained for 30 minutes at room temperature; the temperature is raised briefly to 80°, and the reaction mixture is afterwards added to a mixture of 1 l of water and 40 ml of conc. ammonia. The precipitated reaction product is filtered off and dried: the resulting yield is 24 g of crude 3,4,6-trichloro-5-methoxy-2-cyanobenzoic acid methyl ester, which has a melting point of 100° C after recrystallistion from methanol. It is used as intermediate for the corresponding isoindolinone which is obtained as follows: 14.7 g of 3,4,6-trichloro-5-methoxy-2-cyanobenzoic acid methyl ester is added to a solution of 2.75 g of Na-methylate in 80 ml of methanol. The whole is stirred for 3 hours at room temperature and the solution is then poured into 500 ml of water containing 25 ml of acetic acid. The precipitate is filtered off and dried: the yield is 15 g of 3,3,6-trimethoxy-4,5,7-trichloroisoindolinone having a decomposition point of 138° to 140°.

EXAMPLES 22-28

In the following table are described pigments which are obtained, using the procedure given in the previous example, if 3,4,6-trichloro-5-methoxy-o-cyanobenzoic acid ester is replaced by equimolar amounts of the o-cyano esters listed in column II. The shades of the pigments obtained are shown in column III.

| No. | II Ester component | III Shade |
|---|---|---|
| 22 | benzene ring with Cl, Cl, CN, COOCH$_3$, Cl, CH$_3$S substituents | reddish-yellow |
| 23 | benzene ring with Cl, Cl, CN, COOCH$_3$, Cl, H$_5$C$_2$S substituents | reddish-yellow |
| 24 | benzene ring with Cl, Cl, CN, COOCH$_3$, Cl, phenoxy substituents | yellow |
| 25 | benzene ring with Cl, Cl, CN, COOCH$_3$, Cl, (2-methylphenoxy) substituents | yellow |
| 26 | benzene ring with Cl, Cl, CN, COOCH$_3$, Cl, (4-chlorophenoxy) substituents | yellow |

-continued

| No. | II Ester component | III Shade |
|---|---|---|
| 27 | 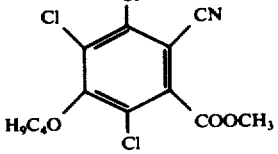 | yellow |
| 28 | 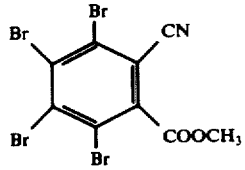 | yellow |

EXAMPLE 29

6.9 g o 1,3,3-trimethoxy-4,5,6,7-tetrachloroisoindolenine and 6.6 g of 5-aminobenzimidazolone are heated in a mixture of 100 ml of glacial acetic acid and 100 ml of o-dichlorobenzene for 3 minutes at 110°–115°. The precipitated orange dyestuff is filtered off hot, washed with ethanol, acetone and water, and dried to give 9.8 g of pigment of the formula

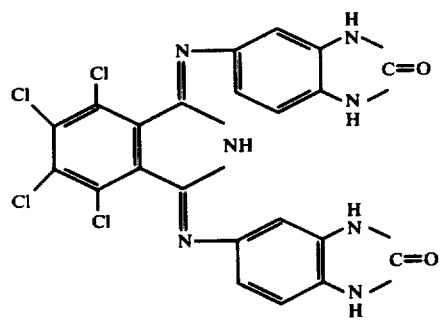

The crude pigment can be used directly for dyeing lacquers or varnishes. The orange dyeings obtained therewith are fast to over-varnishing and have a high degree of fastness to light.

EXAMPLES 30–33

In the following table are listed further pigments which are obtained by condensing, using the procedure described in Example 1, 1,3,3-trimethoxy-4,5,6,7-tetrachloro-isoindolenine with the amine shown in column II, in the molar ratio of 1 : 2.

Table 1

| No. | Amine | Shade in the lacquer |
|---|---|---|
| 30 | 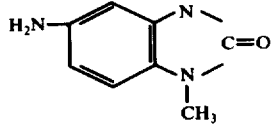 | orange |
| 31 | 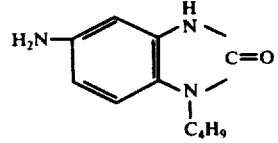 | orange |
| 32 | 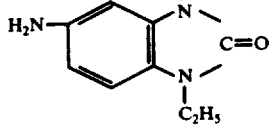 | orange |
| 33 | 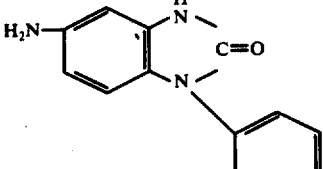 | orange |

EXAMPLE 34

7.2 g of 1,3,3,4,5,6,7-heptachloroisoindolenine, 8.0 g of 7-amino-6-methylphenmorpholone-(3) and 5.0 g of anhydrous sodium acetate are heated in 150 ml of o-dichlorobenzene for 30 minutes at 150°. The pigment formed is filtered off at 100°, washed with methanol, acetone and water, and dried to give 8.3 g of the pigment of the formula

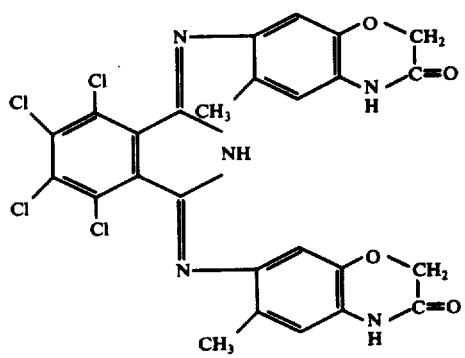

PVC sheets dyed with this deeply coloured pigment are completely fast to migration.

EXAMPLE 35

10.2 g of 1,3,3-trimorpholino-4,5,6,7-tetrachloroisoindolenine and 7.8 g of 6-amino-quinazolone-4 are heated to boiling in 200 ml of glacial acetic acid for 10 minutes with vigorous stirring. The yellow-orange dyestuff formed is filtered off hot, washed with methanol, acetone and water and dried. The yield is 9.8 g of pigment of the formula

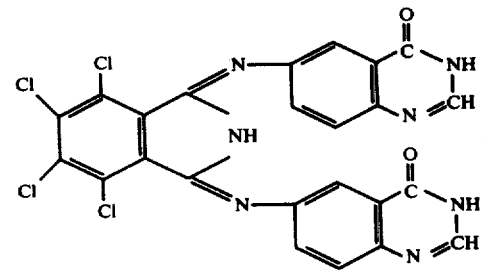

The crude dyestuff powder can be incorporated, without further treatment, into printing inks, thermoplastic substances or lacquers. There are obtained therewith deeply coloured yellow-orange dyeings having excellent fastness properties, especially good fastness to light and to migration.

EXAMPLES 36-39

If the 7.8 g of 6-amino-quinazolone-4 is replaced by equimolar amounts of one of the amines listed in Table 3, the procedure otherwise remaining the same, then there are likewise obtained fast pigments having the shades shown in column 3.

Table 3

| No. | Amine | Shade in printing |
|---|---|---|
| 36 | | yellow-orange |
| 37 | | greenish-yellow |
| 38 | | reddish-yellow |
| 39 | | reddish-yellow |

EXAMPLE 40

5.6 g of 1-amino-3-imino-4,5,6,7-tetrachloroisoindolenine and 7.2 g of 5-amino-1-methyl-benzimidazolone are heated to boiling in 300 ml of glacial acetic acid for 1 hour. The precipitated pigment is filtered off hot, washed with methanol, acetone and water, and then dried to give 9.5 g of orange pigment which is identical with the pigment described in Example 30.

EXAMPLE 41

10 g of titanium dioxide and 2 g of the pigment prepared according to Example 4 are ground with 88 g of a mixture of 26.4 g of coconut alkyd resin, 24.0 g of melamine-formaldehyde resin (50% solid content), 8.8 g of ethylene glycol monomethyl ether and 28.8 g of xylene for 48 hours in a ball mill.

If this lacquer is sprayed on to an aluminium sheet, preliminarily dried for 30 minutes at room temperature and then stoved for 30 minutes at 120° C, then a yellow lacquering is obtained which, with good tinctorial strength, is characterised by very good fastness to overlacquering, light and weather.

EXAMPLE 42

2 g of the pigment prepared according to Example 4 is triturated with 36 g of aluminium hydroxide, 60 g of linseed oil varnish of medium viscosity and 2 g of cobalt linoleate in a three-roller mill. The yellow printings produced with the resulting printing paste are deeply coloured and excellently fast to light.

EXAMPLE 43

0.6 g of the pigment prepared according to Example 9 is mixed together with 67 g of polyvinyl chloride, 33 g of dioctyl phthalate, 2 g of dibutyl tin laurate and 2 g of titanium dioxide, and the mixture is processed in a roller grinding mill for 15 minutes at 160° C into the form of a thin sheet. The yellow dyeing thus produced is deeply coloured and has fastness to migration, heat and light.

What we claim is:

1. An iminoisoindolinone of the formula

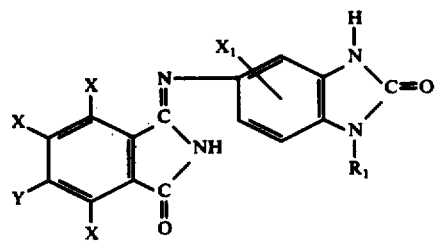

wherein
X represents a halogen atom,
Y represents a halogen atom, alkoxy of 1–4 carbon atoms, phenoxy, chlorophenoxy, methylphenoxy, or alkylthio of 1 or 2 carbon atoms,
$R_1$ represents a hydrogen atom, alkyl having 1–4 carbon atoms, unsubstituted phenyl, phenyl substituted by a halogen atom, alkyl having 1–4 carbon atoms, alkoxy having 1–4 carbon atoms, or alkanoylamino having 1–4 carbon atoms,
$X_1$ represents a hydrogen atom, a halogen atom, alkyl having 1–4 carbon atoms, alkoxy having 1–4 carbon atoms, or phenoxy.

2. The compound according to Claim 1 of the formula

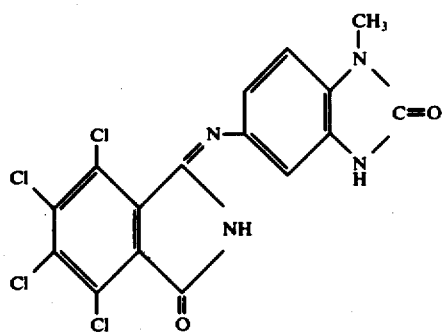

3. The compound according to Claim 1 of the formula

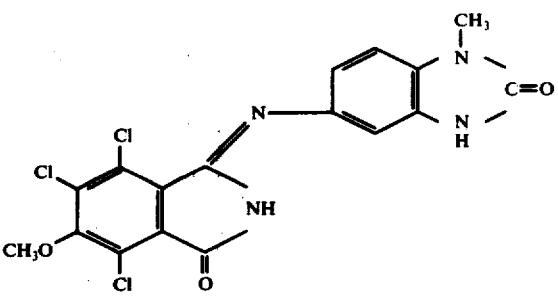

* * * * *